United States Patent [19]

Voorhoeve

[11] 3,878,434
[45] Apr. 15, 1975

[54] POWER-LIMITING ELECTRICAL BARRIER DEVICE
[75] Inventor: Ernst W. Voorhoeve, Maple Glen, Pa.
[73] Assignee: Leeds & Northrup Company, North Wales, Pa.
[22] Filed: Dec. 10, 1973
[21] Appl. No.: 423,335

[52] U.S. Cl. ............... 317/16; 317/31; 317/33 SC; 317/50; 307/93; 323/22 SC; 323/22 Z
[51] Int. Cl. .................. H02h 3/20; H02h 3/08
[58] Field of Search ....... 317/16, 33 SC, 33 VR, 31, 317/49, 50, 61.5; 307/93, 92, 252 B; 323/23, 24, 8

[56] References Cited
UNITED STATES PATENTS

| | | | |
|---|---|---|---|
| 3,389,301 | 6/1968 | Siwko | 307/252 B |
| 3,475,653 | 10/1969 | Odenberg et al. | 317/33 SC |
| 3,493,815 | 2/1970 | Hurtle | 317/33 SC |
| 3,524,997 | 8/1970 | Harnden, Jr. et al. | 307/252 B |
| 3,600,634 | 8/1971 | Muench, Jr. | 317/16 |
| 3,614,539 | 10/1971 | Hallenbeck | 317/16 |
| 3,743,860 | 7/1973 | Rossell | 323/24 |

OTHER PUBLICATIONS
"Practical Transient Supression Circuits for Thyristor Power–Control Systems," by J. Merrett, Mullard Tech. Communications No. 104, March 1970, pages 82–88.

Primary Examiner—J. D. Miller
Assistant Examiner—Patrick R. Salce
Attorney, Agent, or Firm—William G. Miller, Jr.; Raymond F. MacKay

[57] ABSTRACT

The disclosed bipolar barrier device has two triacs for redundant over-voltage protection. These are made conductive when the output voltage exceeds the zener voltage of back-to-back zener diode strings. Thus, a failure constituting over-voltage is protected against even when another failure, such as failure of one triac, occurs. The same pair of triacs provide triple redundant protection against over-current when a third triac is added, for a current detecting resistor biases the third triac or one of the first pair to conduction when the current through the circuit exceeds the desired maximum. A current limiting resistor and a fuse are inserted in the input circuit and a capacitor connected across the input to absorb transient surges.

14 Claims, 1 Drawing Figure

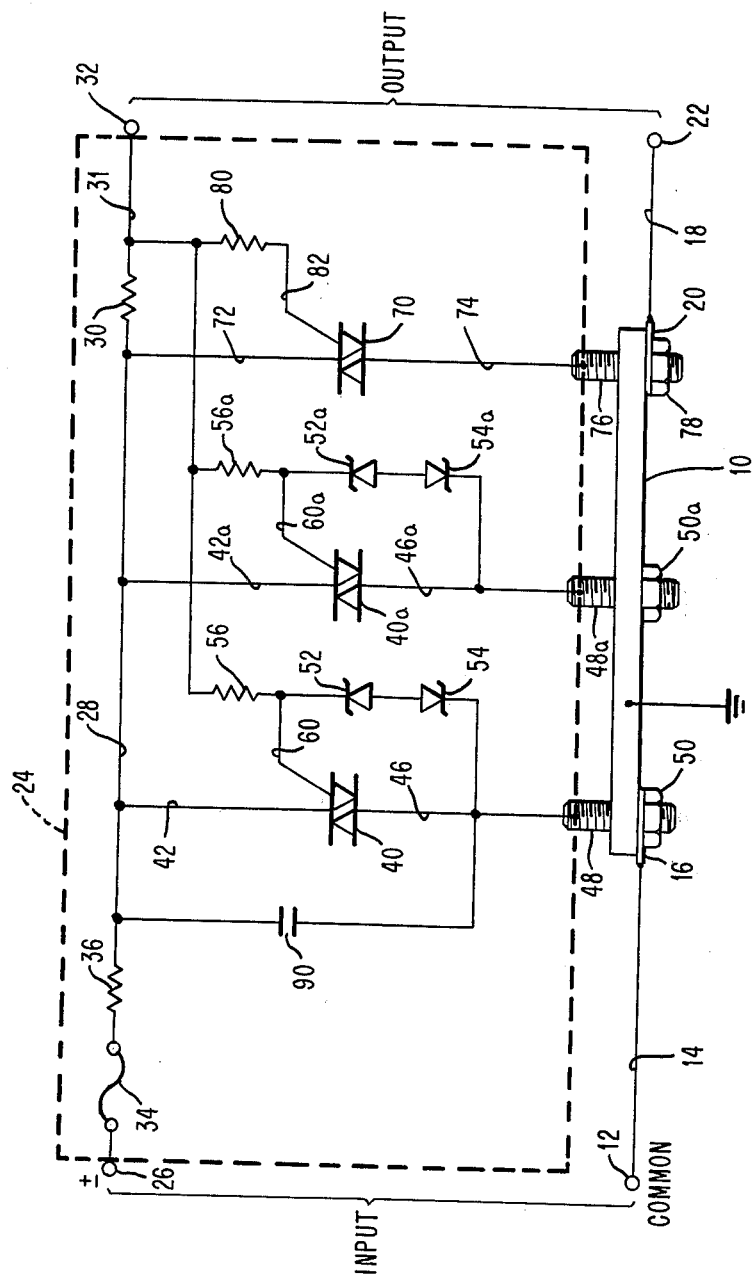

POWER-LIMITING ELECTRICAL BARRIER DEVICE

BACKGROUND OF THE INVENTION

This invention relates to the provision of power-limiting barrier means in input or output circuits associated with instrumentation for hazardous areas where the permissible amount of power transferred to a hazardous area is strictly limited. The barrier circuit can be employed in connection with providing power to a transmitter in a hazardous area so that the transmitter can transmit a signal representing a measured variable such as temperature to a recorder and controller in a safe area. Also the barrier circuit can be used in connection with the transmission of control signals into the hazardous area for actuating control devices such as electropneumatic positioners.

In limiting the power transferred from the safe area to the hazardous area it is necessary for the barrier device to limit both the current and the voltage which may be transmitted to the hazardous area. Thus, the barrier device provides both over-voltage protection and over-current protection.

Barrier devices of the type herein described find particular usefulness in process industries such as the petroleum and chemical industries where combustible gases or vapors may be present in certain areas. The barrier devices also find usefulness in industries where combustible concentrations of dust are present and in other industries where the conditions make it mandatory that measurement and control devices be incapable of igniting any material present or initiating an explosion in the area.

It is usually required that barrier devices be capable of protecting against two failures. One failure, for example, may cause an over-voltage condition while another failure may involve a component protecting against over-voltage. Similarly, in protecting against the over-current condition (not considered a failure since it can result from a shorted load which is a permissible condition) a failure of two components must still leave a circuit for protecting against over-current.

Prior art devices have utilized zener diodes, for example, for shorting out signals which present excessive voltages so that those excessive voltages do not get transmitted to the hazardous area. Current limiting, on the other hand, was provided by fixed resistors. These, of course, caused large insertion losses which were undesirable.

SUMMARY OF THE INVENTION

In providing an electrical barrier for interposition between an input from a safe area and an output to a hazardous area for transmitting power therebetween so as to not exceed a predetermined safe voltage and a predetermined safe current, this invention provides three triac switches each having its first main terminal connected to the input terminal of the barrier device and its second main terminal connected to means adapted for connection to ground, as to a grounded bus, for example. There is also provided a separate isolating device connected between the output terminal of the electrical barrier and the gate of each of the triac switches for providing the necessary electrical isolation between the three triac switches. In addition, the barrier device has a current detecting resistor in circuit between the input and output terminals, with that resistor having a value such that a current flow beyond the predetermined limit will cause a potential drop in the current detecting resistor sufficient to bias the triac switches to a conducting state. A separate pair of zener diodes is connected back-to-back between the gate of each of a pair of the three triac switches and the means adapted for connection to ground so that the diodes become conductive when the voltage exceeds the predetermined voltage limit, thereby biasing the pair of triac switches to a conducting state. The isolating devices may be resistors and the triac switches will advantageously be protected from excessive current by a current limiting resistor and a fuse in the input lead.

BRIEF DESCRIPTION OF THE DRAWING

The single FIGURE of this application is a circuit diagram of a preferred form of the barrier device.

DESCRIPTION OF THE PREFERRED EMBODIMENTS

In the typical installation requiring a barrier device to prevent excessive power from being transferred from a safe area to a hazardous area, there is usually provided a grounded bus such as the grounded bus 10 which can form a part of a common path between the two areas. The bus itself may have more than the single ground connection shown if redundant connections are desired for safety purposes.

It is usually desirable that the barrier device be grounded to the bus and the circuit connection be made in such a way that the bus forms a part of the common path between the input in the safe area and the output in the hazardous area. Thus, in the FIGURE, the common terminal 12 in the safe area is connected by the lead 14 to the bus 10 by way of connector lug 16. The common path is completed through the lead 18 which connects from the lug 20 to the output terminal for the common path at terminal 22.

The barrier device 24 is shown as having an input terminal 26 which may be receiving either a signal or a power supply potential of positive or negative polarity. The input terminal 26 is connected by the input lead 28 through at least a current detecting resistor 30 to the output lead 31 and output terminal 32.

As shown in the FIGURE, there may be interposed in the input lead 28 a fuse 34 and a current limiting resistor 36 whose function will be explained subsequently.

The two triacs 40 and 40a provide over-voltage and over-current protection in the circuit of the FIGURE. The two triacs have their No. 1 main terminal connected by way of leads 42 and 42a to the input lead 28 and their No. 2 main terminal connected by way of leads 46 and 46a to studs 48 and 48a, respectively. Those studs are means which adapt the leads 46 and 46a for easy connection to the bus 10, that connection being by means of the tightening of the associated nuts 50 and 50a so that the lug 16 contacts the bus 10 and so that the respective studs 48 and 48a are in good electrical contact with the bus 10.

The over-voltage protection is provided by the use of strings of zener diodes such as the back-to-back pairs formed by the diodes 52 and 54 for triac 40 and 52a and 54a for triac 40a. Those back-to-back pairs of zener diodes are each connected in series circuit with an isolating device such as resistors 56 and 56a with the series circuit formed thereby connecting the output lead 31 to the No. 2 main terminals of the respective triacs, and hence to the grounded bus 10. The isolating resistors protect the current detecting resistor 30 from being shorted if a triac shorts out from the No. 1 main terminal to the gate. With the circuit described an overvoltage condition such as an excessive voltage between the lead 31 or the lead 28 and the bus 10 will bias a triac such as triac 40, to cause it to become conductive. The bias may result from current flow from the No. 1 main terminal of triac 40 to the gate lead 60 and through diode string 52, 54 or current flow may be through the isolating resistor 56 and zener diodes 52, 54 to bias the gate by way of lead 60. When either the triac 40 or 40a is made conductive by the bias on its gate, input lead 28 is shorted to the bus 10 in avoidance of an excess power transfer to the output and hence to the hazardous area. It will be evident that if, for example, the triac 40 and its associated zener diodes 52 and 54 and isolating resistor 56 fail to operate properly, then the triac 40a and its zener diodes 52a and 54a in combination with resistor 56a provide a redundant over-voltage protection.

Over current protection is provided by both the triacs 40 and 40a as well as by a third triac 70 whose first main terminal is connected by way of lead 72 to the input lead 28 and whose second main terminal is connected by way of lead 74 to the stud 76 which adapts it for connection to the bus 10 whenever the nut 78 is tightened so that the stud 76 makes good electrical contact with the bus 10. The tightening of nut 78, of course, also provides a means for making good contact between the lug 20 and the bus 10.

The triac 70 also has associated with it an isolating device such as resistor 80 which connects between the output lead 31 and the gate lead 82 to the gate of triac 70. It will be evident that the triac 70 and/or triacs 40 and 40a will be made conductive whenever the potential drop across the current resistor 30 is sufficient to provide the necessary bias of the gates with respect to the first main terminals for conduction of the triacs 40, 40a and 70. Thus, the value of the resistor 30 must be such that the necessary bias is provided for the gate leads 60, 60a and 82 to make the triacs 40, 40a and 70, respectively, conductive when excessive current is flowing through resistor 30. If the triacs 40 and 40a should fail to operate in the over-current condition, then the triac 70 will provide the desired triple redundancy for the over-current condition.

It will be evident from the above that the disclosed barrier circuit will provide both over-voltage and over-current protection even if two failures have occurred. For example, if a failure produces excessive voltage both triacs 40 and 40a are operative to protect the output. If at the same time, one of those triacs fails, then the other is available to protect from over-voltage.

Similarly, in connection with over-current conditions (not considered a failure) if two of the three triacs fail, the remaining one is available for over-current protection.

In order that the barrier is not active to short out the input in response to transient signals there is provided a capacitor circuit including capacitor 90 which connects the input lead 28 to the bus 10 by way of lead 46 and stud 48 so that transient signals will be absorbed by the capacitor 90 and will not be effective to turn on any of the triacs of the barrier device.

The resistor 36 is a high wattage resistor which serves to limit the instantaneous current flow through the triacs when over-current or over-voltage conditions occur.

The fuse 34 provides a means for disconnecting the input after a short delay to prevent the triacs and resistor 36 from overheating.

Barrier devices of this type are typically provided in a form such that the entire unit is potted, thus the barrier device 24 is normally inaccessible for any repair and once failure of its components has occurred, it must be replaced. It is also because of the inaccessibility of the components due to the potting of the device that it is important to provide means external to the device which will allow for the testing of its components. Thus, the studs 48, 48a and 76 are provided so that when the barrier device is disconnected from the bus 10 the over-voltage protection circuit and the over-current protection circuit can be separately tested for operability.

Typical value of the components of the circuit in the FIGURE may be:

| Component | Value |
| --- | --- |
| 30 | 35 ohms, 5 watts |
| 34 | ¼ amp |
| 36 | 26 ohms, 11 watts |
| 56, 56a, 80 | 220 ohms, 2 watts |
| 52, 54, 52a, 54a | 24 volts, 1 watt |
| 90 | .05 microfarads | for limiting the voltage to a nominal 24 volts and the current to a nominal 25 milliamps.

Those skilled in the art will understand that the disclosed circuit will be useful for limiting a.c. power as well as for bipolar limiting of d.c. power.

What is claimed is:

1. An electrical barrier for interconnecting an input between an input terminal and a grounded bus to an output between an output terminal and a grounded bus so that the power transmitted between the input and output is limited to a safe magnitude, comprising:
    an input lead for receiving a potential with respect to ground representative of the input,
    an output lead for providing a potential with respect to ground representative of the output,
    a pair of triacs each having one of its main terminals connected to said input lead and the other main terminal adapted for connection to said grounded bus,
    a series connected back-to-back zener diode string and isolating device for each of said triacs, said series circuits each being connected between said output lead and said other main terminal of each triac to allow current through said diode string only when the power signal exceeds the zener voltage of said diodes,
    means connecting the gate of each of said triacs to an associated one of said series circuits at a point such that said series connected device is between said gate and said output lead, whereby an excessive voltage causes the gate of one of the triacs to make the triac conductive so as to short circuit the input lead to ground,
    a third triac having one of its main terminals connected to said input lead and the other main terminal connected by a lead to means adapted for connection to said grounded bus, an isolating device connected between said output lead and the gate of said last named triac, and a current detecting resistor connecting said input and output leads, said resistor being of a value such that an excessive current flowing through it will cause the gate of one of said triacs to make it conductive to thereby short said input lead to ground.

2. An electrical barrier as set forth in claim 1 in which said isolating devices are resistors.

3. An electrical barrier as set forth in claim 1 in which the said other main terminals of each of the three triacs is adapted for connection to a grounded bus by being connected to a threaded stud suitable for being secured to the grounded bus and to a circuit common lead.

4. An electrical barrier as set forth in claim 1 which includes a current limiting resistor in said input lead between said input terminal and the point at which said one of said main terminals of the triacs is connected to said input lead.

5. An electrical barrier as set forth in claim 1 which includes a fuse in said input lead between said input terminal and the point at which said one of said main terminals of the triacs is connected to said input lead.

6. An electrical barrier as set forth in claim 1 which includes a fuse and a current limiting resistor in said input lead between said input terminals and the point at which said one of said main terminals of the triacs is connected to said input lead.

7. An electrical barrier as set forth in claim 6 which includes a capacitor connected between said input lead and a lead adapted for connection to said grounded bus.

8. An electrical barrier for interconnecting an input between an input terminal and a grounded bus to an output between an output terminal and a grounded bus so that the power transmitted between the input and output is limited to a safe magnitude, comprising:

an input lead for receiving a potential with respect to ground representative of the input, an output lead for providing a potential with respect to ground representative of the output, a pair of triacs each having one of its main terminals connected to said input lead and the other main terminal adapted for connection to said grounded bus, a series connected zener diode and isolating device for each of said triacs, said series circuits each being connected between said output lead and said other main terminal of each triac to allow current through said diode only when the power signal exceeds the zener voltage of said diode, means connecting the gate of each of said triacs to an associated one of said series circuits at a point such that said series connected device is between said gate and said output lead, whereby an excessive voltage causes the gate of one of the triacs to make the triac conductive so as to short circuit the input lead to ground, a third triac having one of its main terminals connected to said input lead and the other main terminal connected by a lead to means adapted for connection to said grounded bus, an isolating device connected between said output lead and the gate of said last named triac, and a current detecting resistor connecting said input and output leads, said resistor being of a value such that an excessive current flowing through it will cause the gate of one of said triacs to make it conductive to thereby short said input lead to ground.

9. An electrical barrier as set forth in claim 8 in which said isolating devices are resistors.

10. An electrical barrier as set forth in claim 8 in which the said other main terminals of each of the three triacs is adapted for connection to a grounded bus by being connected to a threaded stud suitable for being secured to the grounded bus and to a circuit common lead.

11. An electrical barrier as set forth in claim 8 which includes a current limiting resistor in said input lead between said input terminal and the point at which said one of said main terminals of the triacs is connected to said input lead.

12. An electrical barrier as set forth in claim 8 which includes a fuse in said input lead between said input terminal and the point at which said one of said main terminals of the triacs is connected to said input lead.

13. An electrical barrier as set forth in claim 8 which includes a fuse and a current limiting resistor in said input lead between said input terminals and the point at which said one of said main terminals of the triacs is connected to said input lead.

14. An electrical barrier as set forth in claim 13 which includes a capacitor connected between said input lead and a lead adapted for connection to said grounded bus.

* * * * *